（12）United States Patent
Chen et al.

(10) Patent No.: US 9,392,247 B2
(45) Date of Patent: Jul. 12, 2016

(54) BUFFER STATE ESTIMATION METHOD AND DEVICE

(71) Applicant: Huawei Technologies Co., Ltd., Shenzhen, Guangdong (CN)

(72) Inventors: Bing Chen, Shenzhen (CN); Shan Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 14/196,997

(22) Filed: Mar. 4, 2014

(65) Prior Publication Data

US 2014/0255007 A1    Sep. 11, 2014

(30) Foreign Application Priority Data

Mar. 5, 2013 (CN) .......................... 2013 1 0069638

(51) Int. Cl.

| G06F 15/16 | (2006.01) |
|---|---|
| H04W 72/04 | (2009.01) |
| H04N 9/87 | (2006.01) |
| H04N 21/24 | (2011.01) |
| H04N 21/44 | (2011.01) |
| H04N 5/76 | (2006.01) |

(52) U.S. Cl.
CPC .............. *H04N 9/87* (2013.01); *H04N 21/2401* (2013.01); *H04N 21/44004* (2013.01); *H04N 5/76* (2013.01)

(58) Field of Classification Search
USPC ................... 709/203, 219, 217, 228, 231, 224
See application file for complete search history.

(56) References Cited

U.S. PATENT DOCUMENTS

| 5,677,969 A | 10/1997 | Auyeung et al. |
|---|---|---|
| 7,177,278 B2 * | 2/2007 | LeBlanc ................. H04L 47/10 370/235 |
| 7,380,028 B2 | 5/2008 | Crinon et al. |
| 7,388,912 B1 | 6/2008 | Katsavounidis et al. |
| 7,574,726 B2 | 8/2009 | Zhang et al. |
| 7,933,328 B2 | 4/2011 | DeGarrido et al. |
| 8,489,923 B1 * | 7/2013 | Lakshminarayanan .................... G06F 11/0751 709/203 |
| 8,874,725 B1 * | 10/2014 | Ganjam .............. H04L 43/0817 709/224 |

(Continued)

FOREIGN PATENT DOCUMENTS

| CN | 101534400 A | 9/2009 |
|---|---|---|
| CN | 102196312 A | 9/2011 |

(Continued)

OTHER PUBLICATIONS

"Performance metrics based on de-jitter buffer events", France Telecom Orange, Oct. 2011, 13 pages.

*Primary Examiner* — Jude Jean Gilles

(57) ABSTRACT

Embodiments of the present invention provide a buffer state estimation method and device. The method includes: obtaining a first continuous play duration corresponding to media data received by a terminal in a period of the present state estimation; calculating a second continuous play duration corresponding to media data in a current buffer according to a buffer state before the present state estimation and the first continuous play duration; and performing state estimation on the buffer according to the buffer state before the present state estimation, preset buffer configuration parameters and the second continuous play duration, and obtaining the present buffer state and start time and duration of the present buffer state, where the buffer state includes at least one of an initial buffering state, a normal play state, a rebuffering state, a play stop state and a play pause state.

27 Claims, 3 Drawing Sheets

(56) References Cited

U.S. PATENT DOCUMENTS

| | | | |
|---|---|---|---|
| 8,874,964 B1 * | 10/2014 | Lakshminarayanan | H04N 21/44209 709/203 |
| 2002/0128788 A1 | 9/2002 | Weickert et al. | |
| 2005/0078651 A1 * | 4/2005 | Lee | H04L 47/10 370/349 |
| 2010/0333148 A1 * | 12/2010 | Musha | H04N 21/23406 725/81 |
| 2011/0292901 A1 * | 12/2011 | Pettersson | H04W 72/1252 370/329 |
| 2012/0110167 A1 | 5/2012 | Joch et al. | |
| 2012/0327799 A1 * | 12/2012 | Sandlund | H04W 72/1221 370/252 |
| 2013/0204238 A1 * | 8/2013 | Lederman | A61B 18/203 606/9 |

FOREIGN PATENT DOCUMENTS

| | | |
|---|---|---|
| CN | 102547449 A | 7/2012 |
| EP | 2 670 084 A1 | 12/2013 |
| WO | WO 2012/119363 A1 | 9/2012 |
| WO | WO 2012/167416 A1 | 12/2012 |

* cited by examiner

BUFFER STATE ESTIMATION METHOD AND DEVICE

CROSS-REFERENCE TO RELATED APPLICATIONS

This application claims priority to Chinese Patent Application No. 201310069638.6, filed on Mar. 5, 2013, which is hereby incorporated by reference in its entirety.

TECHNICAL FIELD

The present invention relates to a communication technology, and in particular, to a buffer state estimation method and device.

BACKGROUND

In an audio-video application of an Internet Protocol (Internet Protocol, IP for short) network, in order to smooth the impact brought by network transmission and implement synchronous play at a receiving end and a sending end, the receiving end needs to temporarily store received audio-video data into a buffer, so as to ensure that the audio-video data still can be played continuously after being transmitted through the IP network. The design of the buffer needs to comprehensively consider the delay and packet loss brought by the buffer. The undersize of the buffer may cause excessive packet losses, and the oversize of the buffer may cause excessive delay of the play. As can be seen from this, a buffer state of the receiving end may directly affect the audio-video play quality. Therefore, it becomes particularly important to assess the audio-video play quality by estimating the state of the buffer.

The prior art is primarily to perform modeling on a buffer in a Real-Time Transport Protocol (Real-Time Transport Protocol, RTP for short)/User Datagram Protocol (User Datagram Protocol, UDP for short) scenario, so as to perform operations such as assessment of the audio-video play quality by estimating the state of the buffer. At present, there are more audio-video applications based on the Transmission Control Protocol (Transmission Control Protocol, TCP for short). Therefore, a buffer state estimation solution for a TCP application scenario is required to provide a condition for assessment of the audio-video play quality in the TCP application scenario.

SUMMARY

Embodiments of the present invention provide a buffer state estimation method and device, which are used to implement buffer state estimation in an audio-video application implemented based on the TCP.

A first aspect provides a buffer state estimation method, including:

obtaining a first continuous play duration corresponding to media data received by a terminal in a period of the present state estimation;

calculating a second continuous play duration corresponding to media data in a current buffer according to a buffer state before the present state estimation and the first continuous play duration; and performing state estimation on the buffer according to the buffer state before the present state estimation, preset buffer configuration parameters and the second continuous play duration, and obtaining the present buffer state and start time and duration of the present buffer state, where a state of the buffer includes at least one of an initial buffering state, a normal play state, a rebuffering state, a play stop state and a play pause state.

With reference to the first aspect, in a first possible implementation manner of the first aspect, the obtaining a first continuous play duration corresponding to media data received by a terminal in a period of the present state estimation includes:

calculating the first continuous play duration according to the number of bytes of the media data received by the terminal in the period of the present state estimation and a current media bit rate; or parsing the media data received by the terminal in the period of the present state estimation, and obtaining the number of frames of the media data received by the terminal in the period of the present state estimation; and calculating the first continuous play duration according to the number of frames of the media data received by the terminal in the period of the present state estimation and a current media frame rate.

With reference to the first possible implementation manner of the first aspect, in a second possible implementation manner of the first aspect, before the calculating the first continuous play duration according to the number of bytes of the media data received by the terminal in the period of the present state estimation and a current media bit rate, the method includes:

receiving a feedback packet sent by the terminal, where the feedback packet is sent by the terminal for the media data received in the period of the present state estimation, and obtaining, according to the feedback packet, the number of bytes of the media data received by the terminal in the period of the present state estimation; or parsing the media data received by the terminal in the period of the present state estimation, and obtaining the number of bytes of the media data received by the terminal in the period of the present state estimation.

With reference to the first aspect, in a third possible implementation manner of the first aspect, the obtaining a first continuous play duration corresponding to media data received by a terminal in a period of the present state estimation includes:

parsing the media data received by the terminal in the period of the present state estimation, and obtaining a maximum decoding time stamp DTS and a minimum decoding time stamp DTS of a full frame included in the media data, or obtaining a maximum presentation time stamp PTS and a minimum presentation time stamp PTS of the full frame included in the media data; and using a difference between the maximum DTS and the minimum DTS as the first continuous play duration, or using a difference between the maximum PTS and the minimum PTS as the first continuous play duration.

With reference to the first aspect, the first possible implementation manner of the first aspect, the second possible implementation manner of the first aspect or the third possible implementation manner of the first aspect, in a fourth possible implementation manner of the first aspect, the calculating a second continuous play duration corresponding to media data in a current buffer according to a buffer state before the present state estimation and the first continuous play duration includes:

if the buffer state before the present state estimation is another buffer state except the normal play state, using a sum of a continuous play duration corresponding to media data in the buffer when a last state estimation ends and the first continuous play duration as the second continuous play duration; or if the buffer state before the present state estimation is the normal play state, subtracting a continuous play duration corresponding to media data required for a normal play in the period of the present state estimation from the sum of the continuous play duration corresponding to the media data in the buffer when the last state estimation ends and the first continuous play duration, so as to obtain the second continuous play duration.

With reference to the first aspect, the first possible implementation manner of the first aspect, the second possible implementation manner of the first aspect, the third possible implementation manner of the first aspect or the fourth possible implementation manner of the first aspect, in a fifth possible implementation manner of the first aspect, the buffer configuration parameters include: initial buffering time and rebuffering time, where:

the initial buffering time refers to a continuous play duration, before the terminal plays media data for a first time, corresponding to minimum media data that needs to be stored in the buffer to implement a normal play;

the rebuffering time refers to a continuous play duration corresponding to minimum media data that needs to be stored in the buffer from a beginning of rebuffering in a process that the terminal plays the media data to the time before the terminal resumes the play of the media data; and the performing state estimation on the buffer according to the buffer state before the present state estimation, preset buffer configuration parameters and the second continuous play duration, and obtaining the present buffer state and start time and duration of the present buffer state includes:

if the buffer state before the present state estimation is the initial buffering state, when the second continuous play duration is greater than or equal to the initial buffering time, determining that the present buffer state is a normal play state and recording the start time and the duration of the present buffer state, or, when the second continuous play duration is less than the initial buffering time, determining that the present buffer state is the initial buffering state and updating the duration of the present buffer state; or if the buffer state before the present state estimation is the rebuffering state, when the second continuous play duration is greater than or equal to the rebuffering time, determining that the present buffer state is a normal play state and recording the start time and the duration of the present buffer state, or, when the second continuous play duration is less than the rebuffering time, determining that the present buffer state is the rebuffering state and updating the duration of the present buffer state.

With reference to the first aspect, the first possible implementation manner of the first aspect, the second possible implementation manner of the first aspect, the third possible implementation manner of the first aspect or the fourth possible implementation manner of the first aspect, in a sixth possible implementation manner of the first aspect, the method further includes:

if the buffer state before the present state estimation is the normal play state, when the second continuous play duration is less than or equal to a preset threshold, determining that this buffering state is a rebuffering state and recording the start time and the duration of this buffering state, or, when the second continuous play duration is greater than the preset threshold, determining that the present buffer state is the normal play state and updating the duration of the present buffer state.

With reference to the first aspect, the first possible implementation manner of the first aspect, the second possible implementation manner of the first aspect, the third possible implementation manner of the first aspect or the fourth possible implementation manner of the first aspect, in a seventh possible implementation manner of the first aspect, the method further includes:

if the buffer state before the present state estimation is the normal play state, when the maximum DTS or the maximum PTS is less than a DTS or a PTS required for a normal play in the period of the present state estimation, determining that this buffering state is a rebuffering state and recording the start time and the duration of this buffering state, or, when the maximum DTS or the maximum PTS is greater than or equal to the DTS or the PTS required for the normal play in the period of the present state estimation, determining that the present buffer state is the normal play state and updating the duration of the present buffer state.

With reference to the first aspect, the first possible implementation manner of the first aspect, the second possible implementation manner of the first aspect, the third possible implementation manner of the first aspect or the fourth possible implementation manner of the first aspect, in an eighth possible implementation manner of the first aspect, the method further includes:

if the buffer state before the present state estimation is the play stop state, determining that the present buffer state is the play stop state.

With reference to the first aspect, the first possible implementation manner of the first aspect, the second possible implementation manner of the first aspect, the third possible implementation manner of the first aspect or the fourth possible implementation manner of the first aspect, in a ninth possible implementation manner of the first aspect, the method further includes:

if the buffer state before the present state estimation is the play pause state, determining that the present buffer state is the play pause state.

With reference to the fifth possible implementation manner of the first aspect, the sixth possible implementation manner of the first aspect, the seventh possible implementation manner of the first aspect, the eighth possible implementation manner of the first aspect or the ninth possible implementation manner of the first aspect, in a tenth possible implementation manner of the first aspect, when the present buffer state is inconsistent with the buffer state before the present state estimation, the recording the start time and the duration of the present buffer state includes:

updating a time point corresponding to a play progress of current media data according to the first continuous play duration and the buffer state before the present state estimation, and obtaining the start time and the duration of the present buffer state according to the updated time point corresponding to the play progress of the media data.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect or the tenth possible implementation manner of the first aspect, in an eleventh possible implementation manner of the first aspect, after the obtaining the present buffer state and the start time and the duration of the present buffer state, the method further includes:

modifying the present buffer state and the start time and the duration of the present buffer state according to a user request.

With reference to the eleventh possible implementation manner of the first aspect, in a twelfth possible implementation manner of the first aspect, the user request includes: a play request, a play resuming request, a seeking request, a play pause request or a play stop request; and the modifying the present buffer state and the start time and the duration of the present buffer state according to a user request includes:

if the user request is the play request or the seeking request, modifying the present buffer state into an initial buffering state and recording the start time and the duration of the present buffer state that has been modified;

if the user request is the play resuming request, modifying the present buffer state into a normal play state and recording the start time and the duration of the present buffer state that has been modified;

if the user request is the play stop request, modifying the present buffer state into a play stop state and recording the start time and the duration of the present buffer state that has been modified; and if the user request is the play pause request, modifying the present buffer state into a play pause state and recording the start time and the duration of the present buffer state that has been modified.

A second aspect provides a buffer state estimation device, including:

a first obtaining module, configured to obtain a first continuous play duration corresponding to media data received by a terminal in a period of the present state estimation;

a calculating module, configured to calculate a second continuous play duration corresponding to media data in a current buffer according to a buffer state before the present state estimation and the first continuous play duration; and a state estimation module, configured to perform state estimation on the buffer according to the buffer state before the present state estimation, preset buffer configuration parameters and the second continuous play duration, and obtain the present buffer state and start time and duration of the present buffer state, where a state of the buffer includes at least one of an initial buffering state, a normal play state, a rebuffering state, a play stop state and a play pause state.

With reference to the second aspect, in a first possible implementation manner of the second aspect, the first obtaining module is specifically configured to calculate the first continuous play duration according to the number of bytes of the media data received by the terminal in the period of the present state estimation and a current media bit rate; or the first obtaining module is specifically configured to parse the media data received by the terminal in the period of the present state estimation, obtain the number of frames of the media data received by the terminal in the period of the present state estimation, and calculate the first continuous play duration according to the number of frames of the media data received by the terminal in the period of the present state estimation and a current media frame rate.

With reference to the first possible implementation manner of the second aspect, in a second possible implementation manner of the second aspect, the buffer state estimation device further includes: a second obtaining module, configured to: before the first obtaining module calculates the first continuous play duration, receive a feedback packet sent by the terminal, where the feedback packet is sent by the terminal for the media data received in the period of the present state estimation, and obtain, according to the feedback packet, the number of bytes of the media data received by the terminal in the period of the present state estimation; or a third obtaining module, configured to: before the first obtaining module calculates the first continuous play duration, parse the media data received by the terminal in the period of the present state estimation, and obtain the number of bytes of the media data received by the terminal in the period of the present state estimation.

With reference to the second aspect, in a third possible implementation manner of the second aspect, the first obtaining module is specifically configured to parse the media data received by the terminal in the period of the present state estimation, obtain a maximum decoding time stamp DTS and a minimum decoding time stamp DTS of a full frame included in the media data, or obtain a maximum presentation time stamp PTS and a minimum presentation time stamp PTS of the full frame included in the media data, and use a difference between the maximum DTS and the minimum DTS as the first continuous play duration, or use a difference between the maximum PTS and the minimum PTS as the first continuous play duration.

With reference to the second aspect, the first possible implementation manner of the second aspect, the second possible implementation manner of the second aspect or the third possible implementation manner of the second aspect, in a fourth possible implementation manner of the second aspect, the calculating module is specifically configured to: when the buffer state before the present state estimation is another buffer state except the normal play state, use a sum of a continuous play duration corresponding to media data in the buffer when a last state estimation ends and the first continuous play duration as the second continuous play duration; or when the buffer state before the present state estimation is the normal play state, subtract a continuous play duration corresponding to media data required for a normal play in the period of the present state estimation from the sum of the continuous play duration corresponding to the media data in the buffer when the last state estimation ends and the first continuous play duration, so as to obtain the second continuous play duration.

With reference to the second aspect, the first possible implementation manner of the second aspect, the second possible implementation manner of the second aspect, the third possible implementation manner of the second aspect or the fourth possible implementation manner of the second aspect, in a fifth possible implementation manner of the second aspect, the buffer configuration parameters include: initial buffering time and rebuffering time, where:

the initial buffering time refers to a continuous play duration, before the terminal plays media data for a first time, corresponding to minimum media data that needs to be stored in the buffer to implement a normal play;

the rebuffering time refers to a continuous play duration corresponding to minimum media data that needs to be stored in the buffer from a beginning of rebuffering in a process that the terminal plays the media data to the time before the terminal resumes the play of the media data; and the state estimation module is specifically configured to: if the buffer state before the present state estimation is the initial buffering state, when the second continuous play duration is greater than or equal to the initial buffering time, determine that the present buffer state is a normal play state and record the start time and the duration of the present buffer state, or, when the second continuous play duration is less than the initial buffering time, determine that the present buffer state is the initial buffering state and update the duration of the present buffer state; and if the buffer state before the present state estimation is the rebuffering state, when the second continuous play duration is greater than or equal to the rebuffering time, determine that the present buffer state is a normal play state and record the start time and the duration of the present buffer state, or, when the second continuous play duration is less than the rebuffering time, determine that the present buffer state is the rebuffering state and update the duration of the present buffer state.

With reference to the second aspect, the first possible implementation manner of the second aspect, the second possible implementation manner of the second aspect, the third possible implementation manner of the second aspect or the fourth possible implementation manner of the second aspect, in a sixth possible implementation manner of the second aspect, the state estimation module is further configured to: if the buffer state before the present state estimation is the normal play state, when the second continuous play duration is less than or equal to a preset threshold, determine that this buffering state is a rebuffering state and record the start time and the duration of this buffering state, or, when the second continuous play duration is greater than the preset threshold, determine that the present buffer state is the normal play state and update the duration of the present buffer state.

With reference to the second aspect, the first possible implementation manner of the second aspect, the second possible implementation manner of the second aspect, the third possible implementation manner of the second aspect or the fourth possible implementation manner of the second aspect, in a seventh possible implementation manner of the second aspect, the state estimation module is further configured to: if the buffer state before the present state estimation is the normal play state, when the maximum DTS or the maximum PTS is less than a DTS or a PTS required for a normal play in the period of the present state estimation, determine that this buffering state is a rebuffering state and record the start time and the duration of this buffering state, or, when the maximum DTS or the maximum PTS is greater than or equal to the DTS or the PTS required for the normal play in the period of the present state estimation, determine that the present buffer state is the normal play state and update the duration of the present buffer state.

With reference to the second aspect, the first possible implementation manner of the second aspect, the second possible implementation manner of the second aspect, the third possible implementation manner of the second aspect or the fourth possible implementation manner of the second aspect, in an eighth possible implementation manner of the second aspect, the state estimation module is further configured to: if the buffer state before the present state estimation is the play stop state, determine that the present buffer state is the play stop state.

With reference to the second aspect, the first possible implementation manner of the second aspect, the second possible implementation manner of the second aspect, the third possible implementation manner of the second aspect or the fourth possible implementation manner of the second aspect, in a ninth possible implementation manner of the second aspect, the state estimation module is further configured to: if the buffer state before the present state estimation is the play pause state, determine that the present buffer state is the play pause state.

With reference to the fifth possible implementation manner of the second aspect, the sixth possible implementation manner of the second aspect, the seventh possible implementation manner of the second aspect, the eighth possible implementation manner of the second aspect or the ninth possible implementation manner of the second aspect, in a tenth possible implementation manner of the second aspect, the state estimation module being configured to record the start time and the duration of the present buffer state includes:

the state estimation module being specifically configured to: when the present buffer state is inconsistent with the buffer state before the present state estimation, update a time point corresponding to a play progress of current media data according to the first continuous play duration and the buffer state before the present state estimation, and obtain the start time and the duration of the present buffer state according to the updated time point corresponding to the play progress of the media data.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, the ninth possible implementation manner of the second aspect or the tenth possible implementation manner of the second aspect, in an eleventh possible implementation manner of the second aspect, the buffer state estimation device further includes: a state modification module, configured to modify the present buffer state and the start time and the duration of the present buffer state according to a user request.

With reference to the eleventh possible implementation manner of the second aspect, in a twelfth possible implementation manner of the second aspect, the user request includes: a play request, a play resuming request, a seeking request, a play pause request or a play stop request; and the state modification module is specifically configured to: if the user request is the play request or the seeking request, modify the present buffer state into an initial buffering state and record the start time and the duration of the present buffer state that has been modified; if the user request is the play resuming request, modify the present buffer state into a normal play state and record the start time and the duration of the present buffer state that has been modified; if the user request is the play stop request, modify the present buffer state into a play stop state and record the start time and the duration of the present buffer state that has been modified; and if the user request is the play pause request, modify the present buffer state into a play pause state and record the start time and the duration of the present buffer state that has been modified.

In the buffer state estimation method and device provided by the embodiments of the present invention, a continuous play duration corresponding to media data in a current buffer is obtained according to a continuous play duration corresponding to media data received by a terminal between two state estimations and a buffer state before the present state estimation, then state estimation is performed on the buffer according to the buffer state before the present state estimation, preset buffer configuration parameters and the continuous play duration corresponding to the media data in the current buffer, and the present buffer state and start time and duration of the present buffer state are obtained. The buffer state estimation process is not limited by a transport protocol, and may be used to estimate a buffer state in a TCP application scenario, and provide a condition for assessment on the audio-video play quality in the TCP application scenario.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following clearly and describes the technical solutions in the embodiments of the present invention with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
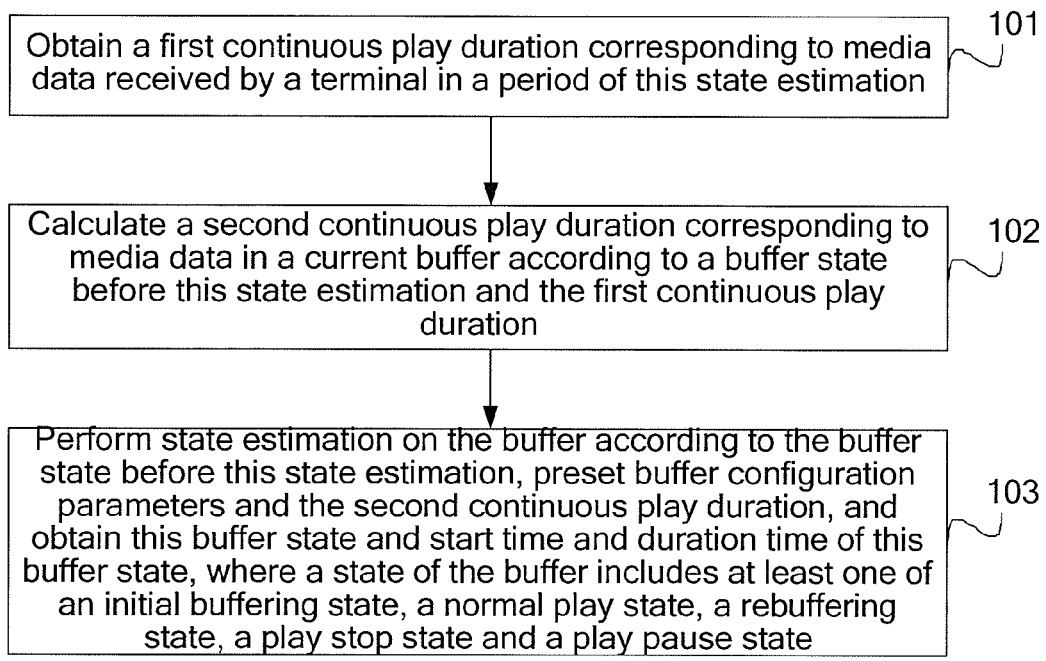
FIG. 1 is a flowchart of a buffer state estimation method according to an embodiment of the present invention.

FIG. 1 is a flowchart of a buffer state estimation method according to an embodiment of the present invention. As shown in FIG. 1, the method in this embodiment includes:

Step 101: Obtain a first continuous play duration corresponding to media data received by a terminal in a period of the present state estimation.

In an optional implementation manner, the obtaining a first continuous play duration includes: calculating the first continuous play duration according to the size of the media data received by the terminal in the period of the present state estimation and current media information. The state estimation period refers to a time interval between a moment when a last state estimation ends and a moment when the present state estimation ends, or refers to a time interval between a moment when the last state estimation starts and a moment when the present state estimation starts.

In a case, the size of the media data received by the terminal in the period of the present state estimation may be represented by the number of bytes of the media data received by the terminal in the period of the present state estimation, and correspondingly, the current media information is a current media bit rate. Based on this, an optional implementation manner of step 101 includes: calculating the first continuous play duration according to the number of bytes of the media data received by the terminal in the period of the present state estimation and the current media bit rate. For example, the first continuous play duration may be obtained according to a formula $RT(i)=S(i)/MR_i$. $S(i)$ in the formula represents the number of bytes of the media data received by the terminal in the period of the present state estimation, $MR(i)$ in the formula represents the current media bit rate, and $RT(i)$ in the formula represents the first continuous play duration. The current media bit rate may be an average media bit rate or a real-time media bit rate.

Optionally, the buffer state estimation method provided by this embodiment of the present invention may be completed by a terminal, so that before performing the optional implementation manner of the step 101, that is, before calculating the first continuous play duration according to the number of bytes of the media data received by the terminal in the period of the present state estimation and the current media bit rate, the terminal may parse the media data received by the terminal in the period of the present state estimation, and obtain the number of bytes of the media data received by the terminal in the period of the present state estimation.

Optionally, the buffer state estimation method provided by this embodiment of the present invention may be completed by a media server or a network node, so that before performing the optional implementation manner of the step 101, that is, before calculating the first continuous play duration according to the number of bytes of the media data received by the terminal in the period of the present state estimation and the current media bit rate, the media server or the network node may receive a feedback packet sent by the terminal, where the feedback packet is sent by the terminal for the media data received by the terminal in the period of the present state estimation, and then obtain, according to the feedback packet, the number of bytes of the media data received by the terminal in the period of the present state estimation. In different application scenarios, the feedback packet is an acknowledgment (ACK) packet based on the TCP or an RTCP packet, and these packets carry information such as the number of bytes of the media data received by the terminal.

In another case, the size of the media data received by the terminal in the period of the present state estimation may be represented by the number of frames of the media data received by the terminal in the period of the present state estimation, and correspondingly, the current media information is a current media frame rate. Based on this, another optional implementation manner of step 101 includes: parsing the media data received by the terminal in the period of the present state estimation, and obtaining the number of frames of the media data received by the terminal in the period of the present state estimation; and calculating the first continuous play duration according to the number of frames of the media data received by the terminal in the period of the present state estimation and the current media frame rate. For example, the first continuous play duration may be calculated according to a formula $RT(i)=N(i)/FR_i$. $N(i)$ in the formula represents the number of frames of media data received by the terminal in the period of the present state estimation, $FR(i)$ in the formula represents the current media frame rate, and $RT(i)$ in the formula represents the first continuous play duration. It is described herein that, in this case, the buffer state estimation method in this embodiment is performed by a terminal.

In another optional implementation manner, the obtaining a first continuous play duration includes: parsing the media data received by the terminal in the period of the present state estimation, and obtaining a maximum decoding time stamp (Decoding Time Stamp, DTS for short) and a minimum DTS of a full frame included in the media data, or obtaining a maximum presentation time stamp (Presentation Time Stamp, PTS for short) and a minimum PTS of the full frame included in the media data; and using a difference between the maximum DTS and the minimum DTS as the first continuous play duration, or using a difference between the maximum PTS and the minimum PTS as the first continuous play duration. For example, the first continuous play duration may be calculated according to a formula $RT(i) = \max(DTS_m, \ldots, DTS_n) - \min(DTS_m, \ldots, DTS_n)$ or a formula $RT(i) = \max(PTS_m, \ldots, PTS_n) - \min(PTS_m, \ldots, PTS_n)$. max( ) in the formula is a MAX function, min( ) is a MIN function, $DTS_m$ in the formula represents a DTS carried by the $m^{th}$ data frame received by the terminal, $DTS_n$ represents a DTS carried by the $n^{th}$ data frame received by the terminal, $PTS_m$ in the formula represents a PTS carried by the $m^{th}$ data frame received by the terminal, and $PTS_n$ represents a PTS carried by the $n^{th}$ data frame received by the terminal. It is described herein that, the implementation manner is performed by a terminal.

Step 102: Calculate a second continuous play duration corresponding to media data in a current buffer according to a buffer state before the present state estimation and the first continuous play duration.

Based on various optional implementation manners or cases in step 101, after the first continuous play duration is obtained, the continuous play duration corresponding to the media data in the current buffer, that is, the second continuous play duration, may be calculated according to the buffer state before the present state estimation and the first continuous play duration.

Figure 2:
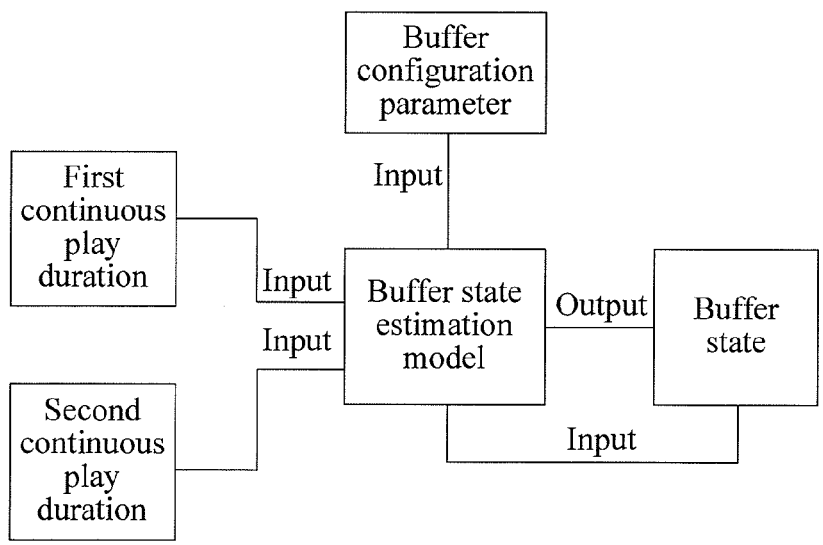
FIG. 2 is a schematic diagram of a buffer state estimation model according to an embodiment of the present invention.

This embodiment provides a buffer state estimation model, where the model uses the first continuous play duration, the second continuous play duration, the buffer state before the present state estimation and buffer configuration parameters as input parameters of the model, and uses information such as the estimated buffer state, and start time and duration of the buffer state as an output result of the model. An intuitive schematic diagram of the model is shown in FIG. 2.

Figure 3:
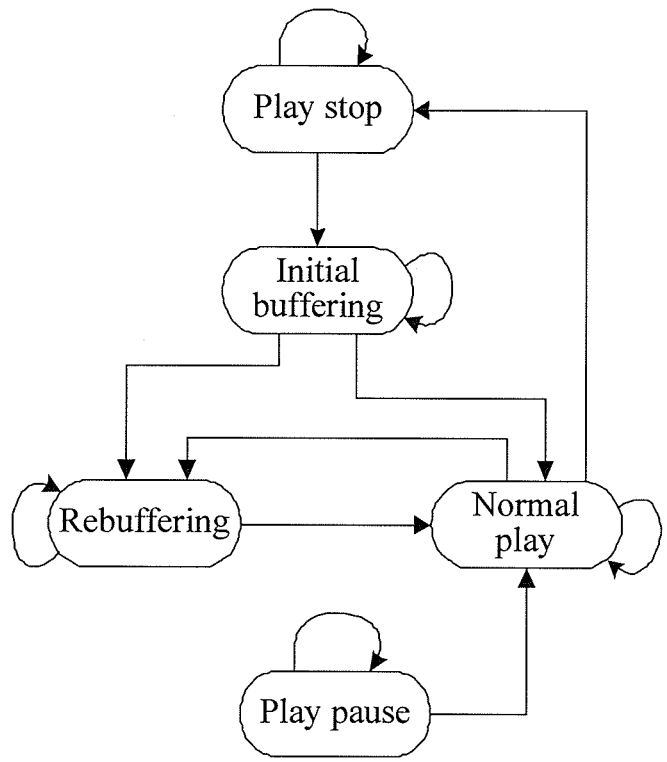
FIG. 3 is a schematic diagram of a shifting relationship between buffer states according to an embodiment of the present invention.

In the embodiments of the present invention, the buffer state of the buffer may include at least one of an initial buffering state, a normal play state, a rebuffering state, a play stop state and a play pause state. An initial state in the buffer state estimation model is set to the initial buffering state, that is to say, if the present state estimation is the first state estimation, the buffer state before the present state estimation is the initial buffering state. In a case where the present state estimation is not the first state estimation, the buffer state before the present state estimation is the buffer state obtained in the last state estimation, the buffer state before the present state estimation may be any one of the initial buffering state, the normal play state, the rebuffering state, the play stop state and the play pause state. Correspondingly, no matter whether the present state estimation is the first state estimation, the present buffer state that is estimated may also be any one of the initial buffering state, the normal play state, the rebuffering state, the play stop state and the play pause state. The shifting between buffer states occurs according to the chronological order of the media play. The shifting relationship between buffer states is shown in FIG. 3.

Based on the buffer state, the process of calculating the second continuous play duration may include:

If the buffer state before the present state estimation is another buffer state except the normal play state, a sum of a continuous play duration corresponding to media data in the buffer when the last state estimation ends and the first continuous play duration is used as the second continuous play duration. For example, the second continuous play duration may be obtained according to a formula $BL(i) = BL(i-1) + RT_i$. $BL(i-1)$ in the formula represents the continuous play duration corresponding to the media data in the buffer when the last state estimation ends, or may represent the size of the media data in the buffer when the last state estimation ends, and $BL(i)$ in the formula represents the second continuous play duration. Because the terminal is not in the normal play state in the time between the two state estimations, the media data in the buffer does not change from the time when the last buffer state estimation ends to the time when the present buffer state estimation starts. Therefore, by adding the continuous play duration corresponding to the media data in the buffer when the last buffer state estimation ends to the continuous play duration corresponding to the media data received by the terminal between the two state estimations, a continuous play duration corresponding to the media data in the current buffer may be obtained.

If the buffer state before the present state estimation is the normal play state, the second continuous play duration is obtained by subtracting a continuous play duration corresponding to media data required for a normal play in the period of the present state estimation from the sum of the continuous play duration corresponding to the media data in the buffer when the last state estimation ends and the first continuous play duration. For example, the second continuous play duration may be obtained according to a formula $BL(i) = BL(i-1) + RT_i - T_i$. $BL(i-1)$ in the formula represents the continuous play duration corresponding to the media data in the buffer when the last state estimation ends, or may represent the size of the media data in the buffer when the last state estimation ends, $T_i$ in the formula represents the continuous play duration corresponding to the media data required for the normal play in the period of the present state estimation, or may represent the size of the media data required for the normal play in the period of the present state estimation, and $BL(i)$ in the formula represents the second continuous play duration. Because the terminal is in the normal play state in the time between the two state estimations, the media data in the buffer changes from the time when the last buffer state estimation ends to the time when the present buffer state estimation starts. Therefore, by subtracting the continuous play duration corresponding to the media data required for the normal play in the period of the present state estimation from the sum of the continuous play duration corresponding to the media data in the buffer when the last buffer state estimation ends and the continuous play duration corresponding to the media data received by the terminal between the two state estimations, the continuous play duration corresponding to the media data in the current buffer may be obtained. Here, the buffer state before the present state estimation refers to the buffer state obtained in the last state estimation.

Step 103: Perform state estimation on the buffer according to the buffer state before the present state estimation, preset buffer configuration parameters and the second continuous play duration, and obtain the present buffer state and start time and duration of the present buffer state, where a state of the buffer includes at least one of an initial buffering state, a normal play state, a rebuffering state, a play stop state and a play pause state.

Based on the foregoing descriptions, after the second continuous play duration is obtained, state estimation may be performed on the buffer according to the buffer state before the present state estimation, the preset buffer configuration parameters and the second continuous play duration, and the present buffer state and the start time and the duration of the present buffer state are obtained.

Optionally, the buffer configuration parameters may include: initial buffering time and rebuffering time. The initial buffering time refers to a continuous play duration, before the terminal plays media data for a first time, corresponding to minimum media data that needs to be stored in the buffer to implement a normal play. The rebuffering time refers to a continuous play duration corresponding to minimum media data that needs to be stored in the buffer from a beginning of rebuffering in a process that the terminal plays the media data to the time before the terminal resumes the play of the media data. It is described herein that, the units of the various continuous play durations may be millisecond, but is not limited thereto.

Based on the buffer configuration parameters, step 103, that is, the performing state estimation on the buffer according to the buffer state before the present state estimation, preset buffer configuration parameters and the second continuous play duration, and obtaining the present buffer state and start time and duration of the present buffer state includes:

if the buffer state before the present state estimation is the initial buffering state, when the second continuous play duration is greater than or equal to the initial buffering time, determining that the present buffer state is a normal play state and recording the start time and the duration of the present buffer state, or, when the second continuous play duration is less than the initial buffering time, determining that the present buffer state is the initial buffering state and updating the duration of the present buffer state; or if the buffer state before the present state estimation is the rebuffering state, when the second continuous play duration is greater than or equal to the rebuffering time, determining that the present buffer state is a normal play state and recording the start time and the duration of the present buffer state, or, when the second continuous play duration is less than the rebuffering time, determining that the present buffer state is the rebuffering state and updating the duration of the present buffer state.

Further, optionally, in addition to the performing state estimation on the buffer according to the buffer state before the present state estimation, preset buffer configuration parameters and the second continuous play duration, and obtaining the present buffer state and start time and duration of the present buffer state, the buffer state estimation method may further include:

if the buffer state before the present state estimation is the normal play state, when the second continuous play duration is less than or equal to a preset second threshold, determining that this buffering state is a rebuffering state and recording the start time and the duration of this buffering state, or, when the second continuous play duration is greater than the preset second threshold, determining that the present buffer state is the normal play state and updating the duration of the present buffer state.

Further, optionally, in addition to the foregoing process of performing state estimation on the buffer, the buffer state estimation method may further include:

if the buffer state before the present state estimation is the normal play state, when the maximum DTS or the maximum PTS is less than a DTS or a PTS required for a normal play in the period of the present state estimation, determining that this buffering state is a rebuffering state and recording the start time and the duration of this buffering state, or, when the maximum DTS or the maximum PTS is greater than or equal to the DTS or the PTS required for the normal play in the period of the present state estimation, determining that the present buffer state is the normal play state and updating the duration of the present buffer state. Here, the buffer state before the present state estimation refers to the buffer state obtained in the last state estimation.

Further, optionally, in addition to the foregoing process of performing state estimation on the buffer, the buffer state estimation method may further include:

if the buffer state before the present state estimation is the play stop state, determining that the present buffer state is the play stop state.

Further, optionally, in addition to the foregoing process of performing state estimation on the buffer, the buffer state estimation method may further include:

if the buffer state before the present state estimation is the play pause state, determining that the present buffer state is the play pause state.

Based on the foregoing various implementation manners of obtaining the present buffer state and the start time and the duration of the present buffer state, when the present buffer state is inconsistent with the buffer state before the present state estimation, the recording the start time and the duration of the present buffer state includes:

updating a time point corresponding to a play progress of current media data according to the first continuous play duration and the buffer state before the present state estimation, and obtaining the start time and the duration of the present buffer state according to the updated time point corresponding to the play progress of the media data. Table 1 shows estimated buffer states and start time and duration of the buffer states.

TABLE 1

| Buffer state | Start time (media play time)/s | Duration/s |
| --- | --- | --- |
| Initial buffering | 0 | 15 |
| Normal play | 0 | 10 |
| Rebuffering | 10 | 20 |
| Normal play | 10 | 5 |
| Play pause | 15 | 20 |
| Normal play | 15 | 10 |
| Rebuffering | 25 | 20 |
| Normal play | 25 | 15 |
| Play stop | 40 | |

In table 1, the start time of each buffer state is each time point corresponding to a play progress of media data. Based on the foregoing implementation manners, after the present buffer state and the start time and the duration of the present buffer state are obtained, the buffer state estimation method further includes:

modifying the present buffer state and the start time and the duration of the present buffer state according to a user request.

The user request includes: a play request (play), a play resuming request (resume), a seeking request (seek), a play pause request (pause) or a play stop request (stop).

For different user requests, the process of modifying the present buffer state and the start time and the duration of the present buffer state is different, for example:

if the user request is the play request or the seeking request, modifying the present buffer state into an initial buffering state and recording the start time and the duration of the present buffer state that has been modified;

if the user request is the play resuming request, modifying the present buffer state into a normal play state and recording the start time and the duration of the present buffer state that has been modified;

if the user request is the play stop request, modifying the present buffer state into a play stop state and recording the start time and the duration of the present buffer state that has been modified; and if the user request is the play pause request, modifying the present buffer state into a play pause state and recording the start time and the duration of the present buffer state that has been modified.

As can be seen from the foregoing descriptions, in this embodiment of the present invention, a continuous play duration corresponding to media data in a current buffer may be obtained according to a continuous play duration corresponding to media data received by a terminal between two state estimations and a buffer state before the present state estimation, then state estimation is performed on the buffer according to the buffer state before the present state estimation, preset buffer configuration parameters and the continuous play duration corresponding to the media data in the current buffer, and the present buffer state and start time and duration of the present buffer state are obtained. The buffer state estimation process is not limited by a transport protocol, and may be used to estimate a buffer state in a TCP application scenario, and provide a condition for assessment on the audio-video play quality in the TCP application scenario. In addition, in this embodiment of the present invention, the buffer state may be modified according to a user request, which fully considers impact of a user behavior on the buffer state, so that a result of the buffer state estimation is closer to the real result and more accurate.

Figure 4:
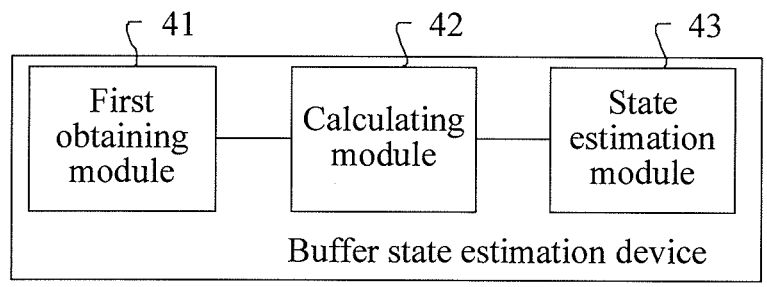
FIG. 4 is a schematic structural diagram of a buffer state estimation device according to an embodiment of the present invention.

FIG. 4 is a schematic structural diagram of a buffer state estimation device according to an embodiment of the present invention. As shown in FIG. 4, the device in this embodiment includes: a first obtaining module 41, a calculating module 42 and a state estimation module 43.

The first obtaining module 41 is configured to obtain a first continuous play duration corresponding to media data received by a terminal in a period of the present state estimation.

The calculating module 42 connected to the first obtaining module 41 is configured to calculate a second continuous play duration corresponding to media data in a current buffer according to a buffer state before the present state estimation and the first continuous play duration obtained by the first obtaining module 41.

The state estimation module 43 connected to the calculating module 42 is configured to perform state estimation on the buffer according to the buffer state before the present state estimation, preset buffer configuration parameters and the second continuous play duration that is calculated by the calculating module 42, and obtain the present buffer state and start time and duration of the present buffer state.

In this embodiment, the buffer state of the buffer may include at least one of an initial buffering state, a normal play state, a rebuffering state, a play stop state and a play pause state. An initial state in the buffer state estimation is set to the initial buffering state. Based on this, if the present state estimation is the first state estimation, the buffer state before the present state estimation is the initial buffering state; if the present state estimation is not the first state estimation, the buffer state before the present state estimation may be: the initial buffering state, the normal play state, the rebuffering state, the play stop state or the play pause state. Correspondingly, no matter whether the present state estimation is the first state estimation, the present buffer state that is estimated may be: the initial buffering state, the normal play state, the rebuffering state, the play stop state or the play pause state.

In an optional implementation manner, the first obtaining module 41 is specifically configured to calculate the first continuous play duration according to the size of the media data received by the terminal in the period of the present state estimation and current media information.

In a case, the size of the media data received by the terminal in the period of the present state estimation is the number of bytes of the media data received by the terminal in the period of the present state estimation, and the current media information is a current media bit rate. Based on this, the first obtaining module 41 is specifically configured to calculate the first continuous play duration according to the number of bytes of the media data received by the terminal in the period of the present state estimation and the current media bit rate.

Figure 5:
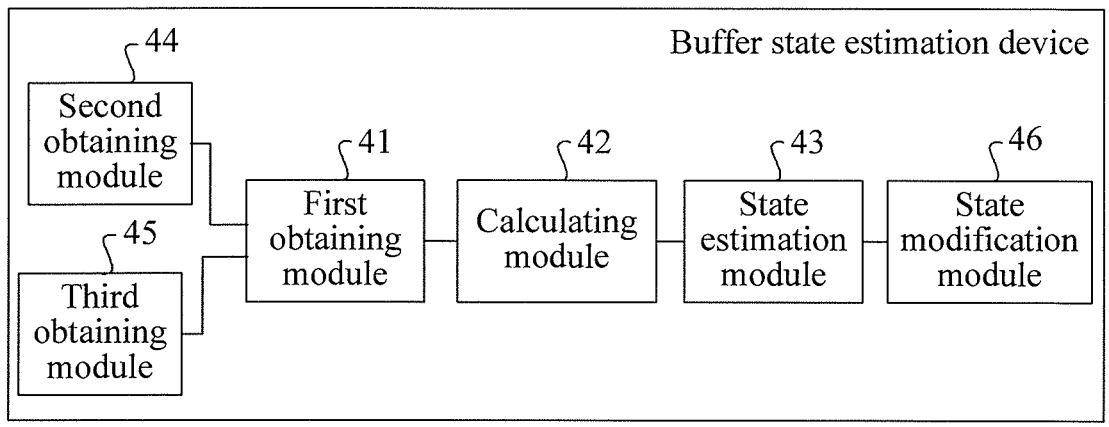
FIG. 5 is a schematic structural diagram of another buffer state estimation device according to an embodiment of the present invention.

Based on the foregoing case, as shown in FIG. 5, the buffer state estimation device further includes: a second obtaining module 44 or a third obtaining module 45.

The second obtaining module 44 connected to the first obtaining module 41 is configured to: before the first obtaining module 41 calculates the first continuous play duration, receive a feedback packet sent by the terminal, where the feedback packet is sent by the terminal for the media data received by the terminal in the period of the present state estimation, and obtain, according to the feedback packet, the number of bytes of the media data received by the terminal in the period of the present state estimation.

The third obtaining module 45 connected to the first obtaining module 41 is configured to: before the first obtaining module 41 calculates the first continuous play duration, parse the media data received by the terminal in the period of the present state estimation, and obtain the number of bytes of the media data received by the terminal in the period of the present state estimation.

It is described herein that, if the buffer state estimation device is the terminal, the buffer state estimation device may include the third obtaining module 45; if the buffer state estimation device is a media server, the buffer state estimation device may include the second obtaining module 44.

In another case, the size of the media data received by the terminal in the period of the present state estimation is the number of frames of the media data received by the terminal in the period of the present state estimation, and the current media information is a current media frame rate. The first obtaining module 41 is specifically configured to parse the media data received by the terminal in the period of the present state estimation, obtain the number of frames of the media data received by the terminal in the period of the present state estimation, and calculate the first continuous play duration according to the number of frames of the media data received by the terminal in the period of the present state estimation and the current media frame rate.

In another optional implementation manner, the first obtaining module 41 is specifically configured to parse the media data received by the terminal in the period of the present state estimation, obtain a maximum DTS and a minimum DTS of a full frame included in the media data, or obtain a maximum PTS and a minimum PTS of the full frame included in the media data, and use a difference between the maximum DTS and the minimum DTS as the first continuous play duration, or use a difference between the maximum PTS and the minimum PTS as the first continuous play duration.

Based on the foregoing descriptions, the calculating module 42 may be specifically configured to: when the buffer state before the present state estimation is another buffer state except the normal play state, use a sum of a continuous play duration corresponding to media data in the buffer when a last state estimation ends and the first continuous play duration as the second continuous play duration; or when the buffer state before the present state estimation is the normal play state, subtract a continuous play duration corresponding to media data required for a normal play in the period of the present state estimation from the sum of the continuous play duration corresponding to the media data in the buffer when the last state estimation ends and the first continuous play duration, so as to obtain the second continuous play duration. Here, the buffer state before the present state estimation refers to the buffer state obtained in the last state estimation.

Optionally, the buffer configuration parameters include: initial buffering time and rebuffering time. The initial buffering time refers to a continuous play duration, before the terminal plays media data for a first time, corresponding to minimum media data that needs to be stored in the buffer to implement a normal play; and the rebuffering time refers to a continuous play duration corresponding to minimum media data that needs to be stored in the buffer from a beginning of rebuffering in a process that the terminal plays the media data to the time before the terminal resumes the play of the media data.

Based on this, the state estimation module 43 may be specifically configured to: if the buffer state before the present state estimation is the initial buffering state, when the second continuous play duration is greater than or equal to the initial buffering time, determine that the present buffer state is a normal play state and record the start time and the duration of the present buffer state, or, when the second continuous play duration is less than the initial buffering time, determine that the present buffer state is the initial buffering state and update the duration of the present buffer state; and if the buffer state before the present state estimation is the rebuffering state, when the second continuous play duration is greater than or equal to the rebuffering time, determine that the present buffer state is a normal play state and record the start time and the duration of the present buffer state, or, when the second continuous play duration is less than the rebuffering time, determine that the present buffer state is the rebuffering state and update the duration of the present buffer state.

Further, optionally, the state estimation module 43 is further configured to: if the buffer state before the present state estimation is the normal play state, when the second continuous play duration is less than or equal to a preset second threshold, determine that this buffering state is a rebuffering state and record the start time and the duration of this buffering state, or, when the second continuous play duration is greater than the preset second threshold, determine that the present buffer state is the normal play state and update the duration of the present buffer state.

Further, optionally, the state estimation module 43 is further configured to: if the buffer state before the present state estimation is the normal play state, when the maximum DTS or the maximum PTS is less than a DTS or a PTS required for a normal play in the period of the present state estimation, determine that this buffering state is a rebuffering state and record the start time and the duration of this buffering state, or, when the maximum DTS or the maximum PTS is greater than or equal to the DTS or the PTS required for the normal play in the period of the present state estimation, determine that the present buffer state is the normal play state and update the duration of the present buffer state. Here, the buffer state before the present state estimation refers to the buffer state obtained in the last state estimation.

Further, optionally, the state estimation module 43 is further configured to: if the buffer state before the present state estimation is the play stop state, determine that the present buffer state is the play stop state.

Further, optionally, the state estimation module 43 is further configured to: if the buffer state before the present state estimation is the play pause state, determine that the present buffer state is the play pause state.

Based on the foregoing descriptions, the state estimation module 43 being configured to record the start time and the duration of the present buffer state includes:

the state estimation module 43 being specifically configured to: when the present buffer state is inconsistent with the buffer state before the present state estimation, update a time point corresponding to a play progress of current media data according to the first continuous play duration and the buffer state before the present state estimation, and obtain the start time and the duration of the present buffer state according to the updated time point corresponding to the play progress of the media data.

As shown in FIG. 5, the buffer state estimation device further includes: a state modification module 46.

The state modification module 46 connected to the state estimation module 43 is configured to modify the present buffer state estimated by the state estimation module 43 and the start time and the duration of the present buffer state according to a user request.

The user request may include: a play request, a play resuming request, a seeking request, a play pause request or a play stop request.

The state modification module 46 is specifically configured to: if the user request is the play request or the seeking request, modify the present buffer state into an initial buffering state and record the start time and the duration of the present buffer state that has been modified; if the user request is the play resuming request, modify the present buffer state into a normal play state and record the start time and the duration of the present buffer state that has been modified; if the user request is the play stop request, modify the present buffer state into a play stop state and record the start time and the duration of the present buffer state that has been modified; and if the user request is the play pause request, modify the present buffer state into a play pause state and record the start time and the duration of the present buffer state that has been modified.

It is described herein that, the buffer state estimation device may be the terminal, or may be a media server or a network node, but is not limited thereto.

Functional modules of the buffer state estimation device provided by this embodiment may be configured to perform the process of the embodiment of the buffer state estimation method shown in FIG. 1, its specific working principle is not described again. For details, see the descriptions of the method embodiments.

In the buffer state estimation device provided by this embodiment, a continuous play duration corresponding to media data in a current buffer may be obtained according to a continuous play duration corresponding to media data received by a terminal between two state estimations and a buffer state before the present state estimation, then state estimation is performed on the buffer according to the buffer state before the present state estimation, preset buffer configuration parameters and the continuous play duration corresponding to the media data in the current buffer, and the present buffer state and start time and duration of the present buffer state are obtained. The process of estimating a buffer state by the buffer state estimation device is not limited by a transport protocol, and may be used to estimate the buffer state in a TCP application scenario, and provide a condition for assessment on the audio-video play quality in the TCP application scenario.

Figure 6:
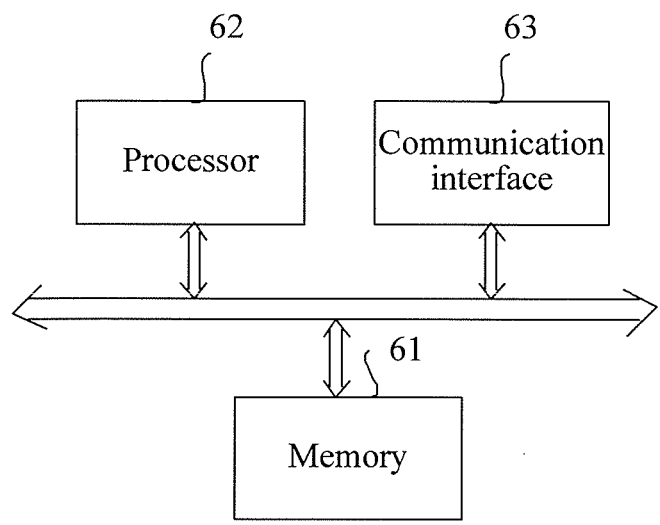
FIG. 6 is a schematic structural diagram of still another buffer state estimation device according to an embodiment of the present invention.

FIG. 6 is a schematic structural diagram of still another buffer state estimation device according to an embodiment of the present invention. As shown in FIG. 6, the buffer state estimation device includes: a memory 61 and a processor 62.

The memory 61 is configured to store a program. Specifically, the program may include program code, where the program code includes a computer operating instruction. The memory 61 may include a high-speed RAM memory, or may include a non-volatile memory (non-volatile memory), such as at least one disk memory.

The processor 62 is configured to execute the program stored by the memory 61, so as to: obtain a first continuous play duration corresponding to media data received by a terminal in a period of the present state estimation; calculate a second continuous play duration corresponding to media data in a current buffer according to a buffer state before the present state estimation and the first continuous play duration; and perform state estimation on the buffer according to the buffer state before the present state estimation, preset buffer configuration parameters and the second continuous play duration, and obtain the present buffer state and start time and duration of the present buffer state.

In this embodiment, the buffer state of the buffer includes at least one of an initial buffering state, a normal play state, a rebuffering state, a play stop state and a play pause state. An initial state in the buffer state estimation is set to the initial buffering state. Based on this, if the present state estimation is the first state estimation, the buffer state before the present state estimation is the initial buffering state; if the present state estimation is not the first state estimation, the buffer state before the present state estimation may be: the initial buffering state, the normal play state, the rebuffering state, the play stop state or the play pause state. Correspondingly, no matter whether the present state estimation is the first state estimation, the present buffer state that is estimated may be: the initial buffering state, the normal play state, the rebuffering state, the play stop state or the play pause state.

In an optional implementation manner, the processor 62 is specifically configured to calculate the first continuous play duration according to the size of the media data received by the terminal in the period of the present state estimation and current media information.

In a case, the size of the media data received by the terminal in the period of the present state estimation is the number of bytes of the media data received by the terminal in the period of the present state estimation, and the current media information is a current media bit rate. The processor 62 is specifically configured to calculate the first continuous play duration according to the number of bytes of the media data received by the terminal in the period of the present state estimation and the current media bit rate.

Optionally, the buffer state estimation device further includes: a communication interface 63.

If the buffer state estimation device is a media server, the communication interface 63 may be configured to: before the processor 62 calculates the first continuous play duration, receive a feedback packet sent by the terminal, where the feedback packet is sent by the terminal for the media data received by the terminal in the period of the present state estimation. Based on this, the processor 62 is specifically configured to obtain, according to the feedback packet, the number of bytes of the media data received by the terminal in the period of the present state estimation, and then calculate the first continuous play duration according to the number of bytes of the media data received by the terminal in the period of the present state estimation and the current media bit rate.

Alternatively, if the buffer state estimation device is the terminal, the communication interface 63 may be configured to receive the media data before the processor 62 calculates the first continuous play duration. The processor 62 is specifically configured to parse the media data received by the communication interface 63 in the period of the present state estimation, obtain the number of bytes of the media data received by the communication interface 63 in the period of the present state estimation, and then calculate the first continuous play duration according to the number of bytes of the media data received by the communication interface 63 in the period of the present state estimation and the current media bit rate.

In another case, the size of the media data received by the terminal in the period of the present state estimation is the number of frames of the media data received by the terminal in the period of the present state estimation, and the current media information is a current media frame rate. Based on this, the processor 62 is specifically configured to parse the media data received by the terminal in the period of the present state estimation, obtain the number of frames of the media data received by the terminal in the period of the present state estimation, and calculate the first continuous play duration according to the number of frames of the media data received by the terminal in the period of the present state estimation and the current media frame rate.

In another optional implementation manner, the processor 62 is specifically configured to parse the media data received by the terminal in the period of the present state estimation; obtain a maximum DTS and a minimum DTS of a full frame included in the media data, or obtain a maximum PTS and a minimum PTS of the full frame included in the media data; and use a difference between the maximum DTS and the minimum DTS as the first continuous play duration, or use a difference between the maximum PTS and the minimum PTS as the first continuous play duration.

In an optional implementation manner, the processor 62 is specifically configured to: when the buffer state before the present state estimation is another buffer state except the normal play state, use a sum of a continuous play duration corresponding to media data in the buffer when a last state estimation ends and the first continuous play duration as the second continuous play duration; or when the buffer state before the present state estimation is the normal play state, subtract a continuous play duration corresponding to media data required for a normal play in the period of the present state estimation from the sum of the continuous play duration corresponding to the media data in the buffer when the last state estimation ends and the first continuous play duration, so as to obtain the second continuous play duration. Here, the buffer state before the present state estimation refers to the buffer state obtained in the last state estimation.

Optionally, the buffer configuration parameters include: initial buffering time and rebuffering time. The initial buffering time refers to a continuous play duration, before the terminal plays media data for a first time, corresponding to minimum media data that needs to be stored in the buffer to implement a normal play; and the rebuffering time refers to a continuous play duration corresponding to minimum media data that needs to be stored in the buffer from a beginning of rebuffering in a process that the terminal plays the media data to the time before the terminal resumes the play of the media data.

Based on this, the processor 62 is specifically configured to: if the buffer state before the present state estimation is the initial buffering state, when the second continuous play duration is greater than or equal to the initial buffering time, determine that the present buffer state is a normal play state and record the start time and the duration of the present buffer state, or, when the second continuous play duration is less than the initial buffering time, determine that the present buffer state is the initial buffering state and update the duration of the present buffer state; and if the buffer state before the present state estimation is the rebuffering state, when the second continuous play duration is greater than or equal to the rebuffering time, determine that the present buffer state is a normal play state and record the start time and the duration of the present buffer state, or, when the second continuous play duration is less than the rebuffering time, determine that the present buffer state is the rebuffering state and update the duration of the present buffer state.

Further, optionally, the processor 62 is further configured to: if the buffer state before the present state estimation is the normal play state, when the second continuous play duration is less than or equal to a preset second threshold, determine that this buffering state is a rebuffering state and record the start time and the duration of this buffering state, or, when the second continuous play duration is greater than the preset second threshold, determine that the present buffer state is the normal play state and update the duration of the present buffer state.

Further, optionally, the processor 62 is further configured to: if the buffer state before the present state estimation is the normal play state, when the maximum DTS or the maximum PTS is less than a DTS or a PTS required for a normal play in the period of the present state estimation, determine that this buffering state is a rebuffering state and record the start time and the duration of this buffering state, or, when the maximum DTS or the maximum PTS is greater than or equal to the DTS or the PTS required for the normal play in the period of the present state estimation, determine that the present buffer state is the normal play state and update the duration of the present buffer state. Here, the buffer state before the present state estimation refers to the buffer state obtained in the last state estimation.

Further, optionally, the processor 62 is further configured to: if the buffer state before the present state estimation is the play stop state, determine that the present buffer state is the play stop state.

Further, optionally, the processor 62 is further configured to: if the buffer state before the present state estimation is the play pause state, determine that the present buffer state is the play pause state.

The processor 62 is specifically configured to: when the present buffer state is inconsistent with the buffer state before the present state estimation, update a time point corresponding to a play progress of current media data according to the first continuous play duration and the buffer state before the present state estimation, and obtain the start time and the duration of the present buffer state according to the updated time point corresponding to the play progress of the media data.

In an optional implementation manner, the communication interface 63 is further configured to receive a user request. The processor 62 is further configured to modify the present buffer state and the start time and the duration of the present buffer state according to the user request.

The user request includes: a play request, a play resuming request, a seeking request, a play pause request or a play stop request.

The processor 62 is specifically configured to: if the user request is the play request or the seeking request, modify the present buffer state into the initial buffering state and record the start time and the duration of the present buffer state that has been modified; if the user request is the play resuming request, modify the present buffer state into the normal play state and record the start time and the duration of the present buffer state that has been modified; if the user request is the play stop request, modify the present buffer state into the play stop state and record the start time and the duration of the present buffer state that has been modified; and if the user request is the play pause request, modify the present buffer state into the play pause state and record the start time and the duration of the present buffer state that has been modified.

Besides the memory 61, the processor 62 and the communication interface 63, the buffer state estimation device in this embodiment further includes a power supply module, a monitor, an input/output device, and the like.

Optionally, in specific implementation, if the memory 61, the processor 62 and the communication interface 63 are separately implemented, the memory 61, the processor 62 and the communication interface 63 may be connected to each other and complete mutual communication by using a bus. The bus may be an industry standard architecture (Industry Standard Architecture, ISA for short) bus, a peripheral component interconnect (PCI for short) bus or an extended industry standard architecture (Extended Industry Standard Architecture, EISA for short) bus. The bus may be classified into an address bus, a data bus, a control bus, and the like. For convenience of representation, the bus is represented only by a thick line in FIG. 6, but it does not indicate that there is only one bus or one type of bus.

Optionally, in specific implementation, if the memory 61, the processor 62 and the communication interface 63 are implemented by being integrated on one chip, the memory 61, the processor 62 and the communication interface 63 may complete mutual communication by using an internal interface.

It is described herein that, the buffer state estimation device may be the terminal, or may be a media server or a network node, but is not limited thereto.

The buffer state estimation device provided by this embodiment may be configured to perform the process of the embodiment of the buffer state estimation method shown in FIG. 1, its specific working principle is not described again. For details, see descriptions of the method embodiments.

In the buffer state estimation device provided by this embodiment, a continuous play duration corresponding to media data in a current buffer may be obtained according to a continuous play duration corresponding to media data received by a terminal between two state estimations and a buffer state before the present state estimation, then state estimation is performed on the buffer according to the buffer state before the present state estimation, preset buffer configuration parameters and the continuous play duration corresponding to the media data in the current buffer, and the present buffer state and start time and duration of the present buffer state are obtained. The process of estimating a buffer state by the buffer state estimation device is not limited by a transport protocol, and may be used to estimate the buffer state in a TCP application scenario, and provide a condition for assessment on the audio-video play quality in the TCP application scenario.

Persons of ordinary skill in the art may understand that, all or a part of the steps of the foregoing method embodiments may be implemented by a program instructing relevant hardware. The program may be stored in a computer readable storage medium. When the program runs, the steps of the forgoing method embodiments are performed. The storage medium includes any medium that can store program code, such as a ROM, a RAM, a magnetic disk, and an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the scope of the technical solutions of the embodiments of the present invention.

What is claimed is:

1. A buffer state estimation method for use in a device having a processor, the method performed by the processor, the method comprising:
   obtaining a first continuous play duration corresponding to media data received by a terminal in a period of the present state estimation;
   calculating a second continuous play duration corresponding to media data stored in a current buffer according to a buffer state before the present state estimation and the first continuous play duration; and
   performing state estimation on the buffer according to the buffer state before the present state estimation, preset buffer configuration parameters and the second continuous play duration, to obtain the present buffer state and start time and duration of the present buffer state, wherein the state of the buffer comprises at least one of an initial buffering state, a normal play state, a rebuffering state, a play stop state and a play pause state.

2. The buffer state estimation method according to claim 1, wherein obtaining the first continuous play duration comprises:
   calculating the first continuous play duration according to the number of bytes of the media data received by the terminal in the period of the present state estimation and a current media bit rate; or
   parsing the media data received by the terminal in the period of the present state estimation, and obtaining the number of frames of the media data received by the terminal in the period of the present state estimation; and calculating the first continuous play duration according to the number of frames of the media data received by the terminal in the period of the present state estimation and a current media frame rate.

3. The buffer state estimation method according to claim 2, wherein before calculating the first continuous play duration, the method comprises:
   receiving a feedback packet sent by the terminal, wherein the feedback packet is sent by the terminal for the media data received in the period of the present state estimation, and obtaining, according to the feedback packet, the number of bytes of the media data received by the terminal in the period of the present state estimation; or
   parsing the media data received by the terminal in the period of the present state estimation, and obtaining the number of bytes of the media data received by the terminal in the period of the present state estimation.

4. The buffer state estimation method according to claim 1, wherein obtaining the first continuous play duration comprises:
   parsing the media data received by the terminal in the period of the present state estimation, and obtaining a maximum decoding time stamp (DTS) and a minimum DTS of a full frame comprised in the media data, or obtaining a maximum presentation time stamp (PTS) and a minimum PTS of the full frame comprised in the media data; and
   using a difference between the maximum DTS and the minimum DTS as the first continuous play duration, or using a difference between the maximum PTS and the minimum PTS as the first continuous play duration.

5. The buffer state estimation method according to claim 2, wherein calculating the second continuous play duration comprises:
   if the buffer state before the present state estimation is another buffer state except the normal play state, using a sum of a continuous play duration corresponding to media data in the buffer when a last state estimation ends and the first continuous play duration as the second continuous play duration; or
   if the buffer state before the present state estimation is the normal play state, subtracting a continuous play duration corresponding to media data required for a normal play in the period of the present state estimation from the sum of the continuous play duration corresponding to the media data in the buffer when the last state estimation ends and the first continuous play duration, so as to obtain the second continuous play duration.

6. The buffer state estimation method according to claim 2, wherein the buffer configuration parameters comprise: initial buffering time and rebuffering time, wherein:
   the initial buffering time refers to a continuous play duration, before the terminal plays media data for a first time, corresponding to minimum media data that needs to be stored in the buffer to implement a normal play;
   the rebuffering time refers to a continuous play duration corresponding to minimum media data that needs to be stored in the buffer from a beginning of rebuffering in a process that the terminal plays the media data to the time before the terminal resumes the play of the media data; and
   performing state estimation on the buffer comprises:
      if the buffer state before the present state estimation is the initial buffering state, when the second continuous play duration is greater than or equal to the initial buffering time, determining that the present buffer state is a normal play state and recording the start time and the duration of the present buffer state, or, when the second continuous play duration is less than the initial buffering time, determining that the present buffer state is the initial buffering state and updating the duration of the present buffer state; or
      if the buffer state before the present state estimation is the rebuffering state, when the second continuous play duration is greater than or equal to the rebuffering time, determining that the present buffer state is a normal play state and recording the start time and the duration of the present buffer state, or, when the second continuous play duration is less than the rebuffering time, determining that the present buffer state is the rebuffering state and updating the duration of the present buffer state.

7. The buffer state estimation method according to claim 2, further comprising:
   if the buffer state before the present state estimation is the normal play state, when the second continuous play duration is less than or equal to a preset threshold, determining that the present buffering state is a rebuffering state and recording the start time and the duration of this buffering, or, when the second continuous play duration is greater than the preset threshold, determining that the present buffer state is the normal play state and updating the duration of the present buffer state.

8. The buffer state estimation method according to claim 2, further comprising:
if the buffer state before the present state estimation is the normal play state, when the maximum DTS or the maximum PTS is less than a DTS or a PTS required for a normal play in the period of the present state estimation, determining that this buffering state is a rebuffering state and recording the start time and the duration of this buffering state, or, when the maximum DTS or the maximum PTS is greater than or equal to the DTS or the PTS required for the normal play in the period of the present state estimation, determining that the present buffer state is the normal play state and updating the duration of the present buffer state.

9. The buffer state estimation method according to claim 2, further comprising:
if the buffer state before the present state estimation is the play stop state, determining that the present buffer state is the play stop state.

10. The buffer state estimation method according to claim 2, further comprising:
if the buffer state before the present state estimation is the play pause state, determining that the present buffer state is the play pause state.

11. The buffer state estimation method according to claim 2, wherein:
when the present buffer state is inconsistent with the buffer state before the present state estimation, recording the start time and the duration of the present buffer state comprises:
updating a time point corresponding to a play progress of current media data according to the first continuous play duration and the buffer state before the present state estimation, and obtaining the start time and the duration of the present buffer state according to the updated time point corresponding to the play progress of the media data.

12. The buffer state estimation method according to claim 2, wherein after obtaining the present buffer state and the start time and the duration of the present buffer state, the method further comprises:
modifying the present buffer state and the start time and the duration of the present buffer state according to a user request.

13. The buffer state estimation method according to claim 12, wherein the user request comprises: a play request, a play resuming request, a seeking request, a play pause request or a play stop request;
modifying the present buffer state and the start time and the duration of the present buffer state according to a user request comprises:
if the user request is the play request or the seeking request, modifying the present buffer state into an initial buffering state and recording the start time and the duration of the present buffer state that has been modified;
if the user request is the play resuming request, modifying the present buffer state into a normal play state and recording the start time and the duration of the present buffer state that has been modified;
if the user request is the play stop request, modifying the present buffer state into a play stop state and recording the start time and the duration of the present buffer state that has been modified; and if the user request is the play pause request, modifying the present buffer state into a play pause state and recording the start time and the duration of the present buffer state that has been modified.

14. A buffer state estimation device, comprising:
a processor; and
memory coupled to the processor, the memory including instructions that, when executed by the processor, cause the buffer state estimation device to:
obtain a first continuous play duration corresponding to media data received by a terminal in a period of the present state estimation;
calculate a second continuous play duration corresponding to media data in a current buffer according to a buffer state before the present state estimation and the first continuous play duration; and
perform state estimation on the buffer according to the buffer state before the present state estimation, preset buffer configuration parameters and the second continuous play duration, and obtain the present buffer state and start time and duration of the present buffer state, wherein a state of the buffer comprises at least one of an initial buffering state, a normal play state, a rebuffering state, a play stop state and a play pause state.

15. The buffer state estimation device according to claim 14, including instructions that, when executed by the processor, cause the buffer state estimation device to calculate the first continuous play duration according to the number of bytes of the media data received by the terminal in the period of the present state estimation and a current media bit rate; or
parse the media data received by the terminal in the period of the present state estimation, obtain the number of frames of the media data received by the terminal in the period of the present state estimation, and calculate the first continuous play duration according to the number of frames of the media data received by the terminal in the period of the present state estimation and a current media frame rate.

16. The buffer state estimation device according to claim 15, further comprising instructions that, when executed by the processor, cause the buffer state estimation device to:
before calculating the first continuous play duration, receive a feedback packet sent by the terminal, wherein the feedback packet is sent by the terminal for the media data received in the period of the present state estimation, and obtain, according to the feedback packet, the number of bytes of the media data received by the terminal in the period of the present state estimation; or
before calculating the first continuous play duration, parse the media data received by the terminal in the period of the present state estimation, and obtain the number of bytes of the media data received by the terminal in the period of the present state estimation.

17. The buffer state estimation device according to claim 14, including instructions that, when executed by the processor, cause the buffer state estimation device to parse the media data received by the terminal in the period of the present state estimation, obtain a maximum decoding time stamp (DTS), and a minimum DTS of a full frame comprised in the media data, or obtain a maximum presentation time stamp (PTS) and a minimum PTS of the full frame comprised in the media data, and use a difference between the maximum DTS and the minimum DTS as the first continuous play duration, or use a difference between the maximum PTS and the minimum PTS as the first continuous play duration.

18. The buffer state estimation device according to claim 15, including instructions that, when executed by the processor, cause the buffer state estimation device to: when the buffer state before the present state estimation is another buffer state except the normal play state, use a sum of a continuous play duration corresponding to media data in the buffer when a last state estimation ends and the first continuous play duration as the second continuous play duration; or when the buffer state before the present state estimation is the normal play state, subtract a continuous play duration corresponding to media data required for a normal play in the period of the present state estimation from the sum of the continuous play duration corresponding to the media data in the buffer when the last state estimation ends and the first continuous play duration, so as to obtain the second continuous play duration.

19. The buffer state estimation device according to claim 15, wherein the buffer configuration parameters comprise: initial buffering time and rebuffering time, wherein:
the initial buffering time refers to a continuous play duration, before the terminal plays media data for a first time, corresponding to minimum media data that needs to be stored in the buffer to implement a normal play;
the rebuffering time refers to a continuous play duration corresponding to minimum media data that needs to be stored in the buffer from a beginning of the time when a continuous play duration corresponding to the media data in the buffer is less than or equal to a preset threshold to the time before the continuous play duration corresponding to the media data in the buffer is greater than the preset threshold; and
including instructions that, when executed by the processor, cause the buffer state estimation device to: if the buffer state before the present state estimation is the initial buffering state, when the second continuous play duration is greater than or equal to the initial buffering time, determine that the present buffer state is a normal play state and record the start time and the duration of the present buffer state, or, when the second continuous play duration is less than the initial buffering time, determine that the present buffer state is the initial buffering state and update the duration of the present buffer state; and if the buffer state before the present state estimation is the rebuffering state, when the second continuous play duration is greater than or equal to the rebuffering time, determine that the present buffer state is a normal play state and record the start time and the duration of the present buffer state, or, when the second continuous play duration is less than the rebuffering time, determine that the present buffer state is the rebuffering state and update the duration of the present buffer state.

20. The buffer state estimation device according to claim 15, including instructions that, when executed by the processor, cause the buffer state estimation device to: if the buffer state before the present state estimation is the normal play state, when the second continuous play duration is less than or equal to a preset threshold, determine that this buffering state is a rebuffering state and record the start time and the duration of this buffering state, or, when the second continuous play duration is greater than the preset threshold, determine that the present buffer state is the normal play state and update the duration of the present buffer state.

21. The buffer state estimation device according to claim 15, including instructions that, when executed by the processor, cause the buffer state estimation device to: if the buffer state before the present state estimation is the normal play state, when the maximum DTS or the maximum PTS is less than a DTS or a PTS required for a normal play in the period of the present state estimation, determine that this buffering state is a rebuffering state and record the start time and the duration of this buffering state, or, when the maximum DTS or the maximum PTS is greater than or equal to the DTS or the PTS required for the normal play in the period of the present state estimation, determine that the present buffer state is the normal play state and update the duration of the present buffer state.

22. The buffer state estimation device according to claim 15, including instructions that, when executed by the processor, cause the buffer state estimation device to: if the buffer state before the present state estimation is the play stop state, determine that the present buffer state is the play stop state.

23. The buffer state estimation device according to claim 15, including instructions that, when executed by the processor, cause the buffer state estimation device to: if the buffer state before the present state estimation is the play pause state, determine that the present buffer state is the play pause state.

24. The buffer state estimation device according to claim 19, including instructions that, when executed by the processor, cause the buffer state estimation device to: when the present buffer state is inconsistent with the buffer state before the present state estimation, update a time point corresponding to a play progress of current media data according to the first continuous play duration and the buffer state before the present state estimation, and obtain the start time and the duration of the present buffer state according to the updated time point corresponding to the play progress of the media data.

25. The buffer state estimation device according claim 15, further comprising instructions that, when executed by the processor, cause the buffer state estimation device to:
modify the present buffer state and the start time and the duration of the present buffer state according to a user request.

26. The buffer state estimation device according to claim 25, wherein the user request comprises: a play request, a play resuming request, a seeking request, a play pause request or a play stop request; and
including instructions that, when executed by the processor, cause the buffer state estimation device to: if the user request is the play request or the seeking request, modify the present buffer state into an initial buffering state and record the start time and the duration of the present buffer state that has been modified; if the user request is the play resuming request, modify the present buffer state into a normal play state and record the start time and the duration of the present buffer state that has been modified; if the user request is the play stop request, modify the present buffer state into a play stop state and record the start time and the duration of the present buffer state that has been modified; and if the user request is the play pause request, modify the present buffer state into a play pause state and record the start time and the duration of the present buffer state that has been modified.

27. The buffer state estimation device according to claim 15, wherein the buffer state estimation device is the terminal or a media server.

* * * * *